United States Patent [19]

Kurata

[11] Patent Number: 4,971,446

[45] Date of Patent: Nov. 20, 1990

[54] VALID PATCH DISCRIMINATION METHOD FOR AUTOMATIC DENSITY CONTROL APPARATUS

[75] Inventor: Yoshiaki Kurata, Ibaraki, Japan

[73] Assignee: Komori Printing Machinery Co., Ltd., Japan

[21] Appl. No.: 275,281

[22] Filed: Nov. 23, 1988

[51] Int. Cl.[5] .................... G01J 3/51

[52] U.S. Cl. .................... 356/402; 250/226

[58] Field of Search .................... 356/402; 250/226

[56] References Cited

U.S. PATENT DOCUMENTS

| | | | |
|---|---|---|---|
| 3,835,777 | 9/1974 | Krygeris | 250/226 X |
| 4,289,405 | 9/1981 | Tobias | 250/226 X |
| 4,505,589 | 3/1985 | Ott et al. | 250/226 X |

*Primary Examiner*—Vincent P. McGraw
*Attorney, Agent, or Firm*—Remy J. VanOphem

[57] ABSTRACT

In a valid patch discrimination method for an automatic density control apparatus, a density of a color bar printed on a paper is measured in units of colors, a predetermined calculation is performed based on the measurement result, and the calculation result is compared with a prestored value to discriminate a presence/absence of a valid color patch.

1 Claim, 2 Drawing Sheets

VALID PATCH DISCRIMINATION METHOD FOR AUTOMATIC DENSITY CONTROL APPARATUS

BACKGROUND OF THE INVENTION

The present invention relates to a valid patch discrimination method for an automatic density control apparatus.

Normally, in density control of a print, a color patch in a color bar (control strip) printed on a margin portion of printed matter is measured by a densitometer, and a degree of opening of an ink key or an ink amount of a printing press is manually or automatically controlled based on the measured density. In recent years, an automatic density control apparatus has been proposed wherein a color bar is measured by a scanning type densitometer, the measured density is compared with a prestored reference density, and the degree of opening of an ink key of a printing press is automatically controlled.

However, a variety of sizes of paper are used in printing, and paper smaller than maximum paper for a printing press is frequently used for printing. For this reason, when a density is measured by the scanning type densitometer, a valid color patch is determined by the following methods, and density measurement and control are performed. In a first method, an operator inputs a paper size or nonused ink key, and a measurement/control range is determined based on the input data. In a second method, a measurement start patch is printed in a color bar, and the measurement/control range is determined according to the position of the patch.

However, the first method applies a load to the operator. In the second method, the measurement start patch must be printed for each paper size, and another patch corresponding to the printed patch must be deleted. A color may be corrected due to temporary contamination or omission (a color patch or its part is not printed due to a process error or contamination on a plate) although it need not be corrected.

SUMMARY OF THE INVENTION

It is, therefore, an object of the present invention to provide a valid patch discrimination method for an automatic density control apparatus, which can prevent erroneous density control.

It is another object of the present invention to provide a valid patch discrimination method for an automatic density control apparatus, which requires no measurement start patch.

It is still another object of the present invention to provide a valid patch discrimination method for an automatic density control apparatus, which can cope with the presence of a color which is partially used.

It is still another object of the present invention to provide a valid patch discrimination method for an automatic density control apparatus, which can automatically control an ink key.

In order to achieve the above objects, according to the present invention, there is provided a valid color patch discrimination method for an automatic density control apparatus, which includes the steps of measuring a density of a color bar printed on paper in units of colors; performing a predetermined calculation based on the measurement result; comparing the calculation result with a prestored value; and discriminating a presence/absence of a valid color patch.

With this method, an ink key corresponding to a color patch discriminated as an invalid color patch is protected.

DETAILED DESCRIPTION OF THE PREFERRED EMBODIMENT

An embodiment of the present invention will now be described with reference to the accompanying drawings.

Figure 1:
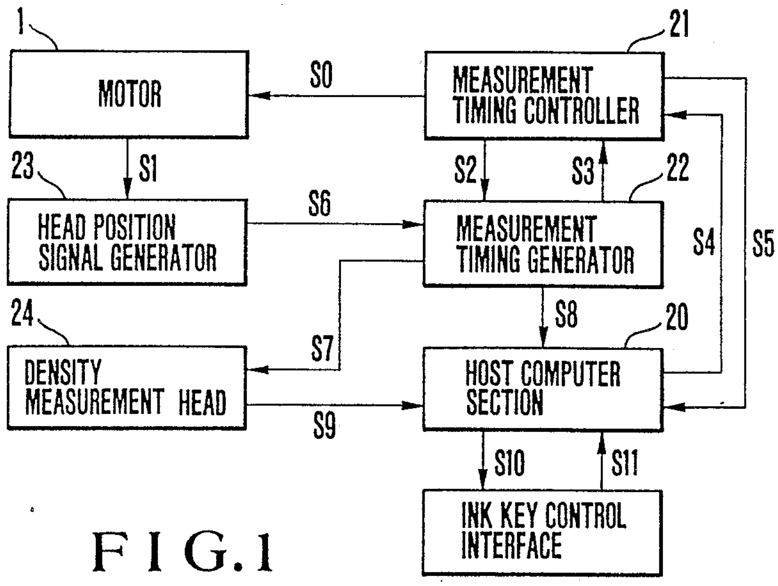
FIG. 1 is a block diagram showing an embodiment of the present invention.
Figure 4:
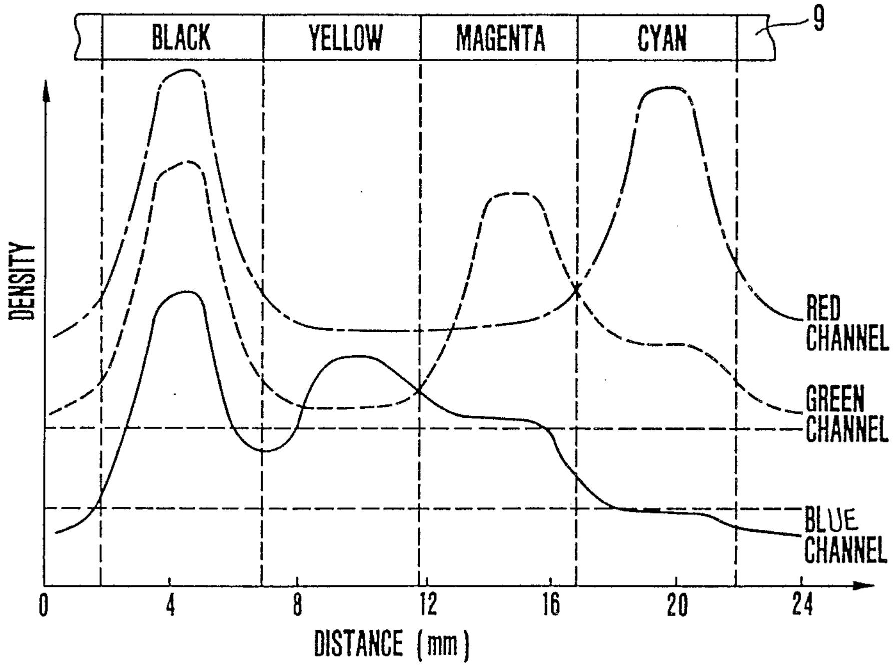
FIG. 4 is a graph showing characteristics of colors.
Figure 2:
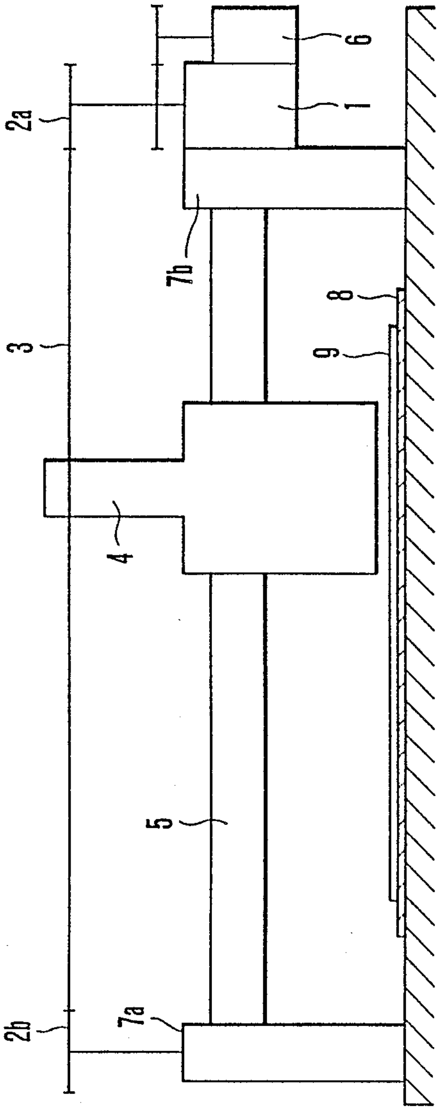
FIG. 2 is a view showing an arrangement of a scanning type densitometer.
Figure 3:
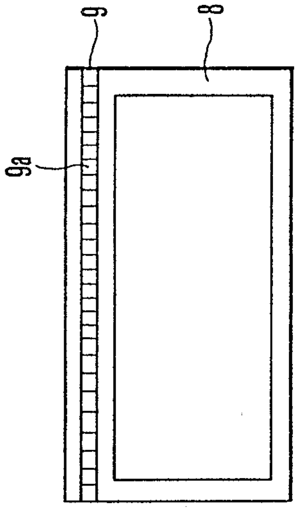
FIG. 3 is a view showing a position of a color bar.

FIGS. 1 and 2 show an embodiment of the present invention. In FIG. 2, when a motor 1 is rotated, a measurement head 4 movably supported on a guide 5 is moved in the right-and-left direction in FIG. 2 through a pulley 2*a* and a wire 3. In this case, a rotary encoder 6 outputs a pulse signal according to a moving distance of the measurement head 4. Note that reference numeral 2*b* denotes a pulley; 7*a* and 7*b*, columns; 8, printing paper; and 9, a color bar. The color bar 9 is printed on a margin portion of the printing paper 8, as shown in FIG. 3, and consists of a large number of color patches 9*a*. Each patch position of the color bar 9 is determined with reference to the center in the right-and-left direction of the paper.

In FIG. 1, a host computer section 20 processes data, and also serves as a man-machine interface (not shown) such as a keyboard, a CRT display, a printer, and the like. When the host computer section 20 receives a start signal from the keyboard, it transmits a start data block signal $S_4$ including a measurement condition and the like to a measurement timing controller 21. When the measurement timing controller 21 receives the signal $S_4$, it outputs a start signal $S_0$ to the motor 1 for driving the measurement head, and transmits timing generation data $S_2$ to a measurement timing generator 22 while monitoring a status signal $S_3$ output from the measurement timing generator 22.

A head position signal generator 23 receives a signal $S_1$ synchronous with rotation of the motor 1, and sends a signal $S_6$ indicating a head position to the measurement timing generator 22. Based on the timing generation signal $S_2$ and the signal $S_6$ indicating the head position, the measurement timing generator 22 outputs a control (channel selection) signal $S_7$ to a density measurement head 24 and also outputs a fetch enable signal $S_8$ to the host computer section 20. The control (channel selection) signal $S_7$ is sequentially selected while determining the order of red, green, and blue, and the host computer section 20 fetches density signals $S_9$ from the density measurement head 24 in the order of red, green, and blue in response to the fetch enable signal $S_8$.

The measurement timing controller 21 receives a status signal $S_3$ from the measurement timing generator 22, and when the status signal $S_3$ indicates a stop state, it outputs a stop signal to the motor 1, and a measurement end signal $S_5$ to the host computer section 20. Upon reception of the signal $S_5$, the host computer section 20 ends measurement. With the above processing, patch data of the color bar are stored in the host computer section 20 in units of red, green, and blue channels.

When printed colors (black, cyan, magenta, and yellow) are measured by the densitometer, they have characteristics as shown in FIG. 3. The absolute position of each patch to be used is fixed, and the host computer section 20 stores the absolute position. Therefore, the host computer section 20 checks whether or not the already stored data for each channel coincides with the characteristics shown in FIG. 3. If a noncoincidence is found, the host computer section 20 determines that the corresponding data is obtained by measuring a portion where no patch is printed, invalidates the data, and protects (does not control) an ink key corresponding to the patch. Thus, the presence/absence of a valid patch can be automatically discriminated, and erroneous control of an ink key corresponding to a patch discriminated as an invalid patch can be prevented.

Invalidation of data of each color is discriminated by the following inequalities based on FIG. 3.

(a) Black Patch

Br < BL, Bg < BL, Bb < BL, Br/Bg > BsL1, and Bg/Br > BsL2
where
Br, Bg, Bb: measurement values of the black patch in red, green and blue channels, respectively
BsL1: threshold data of a ratio of Br to Bg
BsL2: threshold data of a ratio of Bg to Br
BL: minimum threshold data of the black patch (b) Cyan Patch (Cr/Cb) < CsL
where
Cr, Cb: measurement values of the cyan patch in red and blue channels, respectively
CsL: threshold data of a ratio of Cr to Cb (c) Magenta Patch (Mg/Mr) < MsL
where
Mg, Mr: measurement values of the magenta patch in green and red channels, respectively
MsL: threshold data of a ratio of Mg to Mr (d) Yellow Patch (Yb/Yr) < YsL
where
Yb, Yr: measurement values of the yellow patch in blue and red channels, respectively
YsL: threshold data of a ratio of Yb to Yr Note that a base for fixing printing paper in position has characteristics other than those of the patches.

An ink key is controlled such that the host computer section 20 calculates control data $S_{10}$ based on measured data, a prestored reference density, and a signal $S_{11}$ indicating the present opening data of the ink key, and transmits the control data $S_{10}$ to an external apparatus (ink key control apparatus) through an interface. In this case, for an ink key corresponding to a patch discriminated as an invalid patch, the present value is used as control data as it is.

As described above, since the apparatus of the present invention discriminates validity of data of each patch, erroneous control for detecting a change in characteristics to invalidate the patch when a patch is temporarily contaminated can be prevented. Since no measurement start patch is required, various types of film can be printed by centering regardless of a paper size. If some colors are partially used, the apparatus of the present invention can cope with it. An ink key can be automatically controlled regardless of a paper size.

What is claimed is:

1. A valid color patch discrimination method for an automatic density control apparatus, comprising the steps of:
measuring in a red, a green, and a blue channel a density of a color bar printed on paper, said color bar having black, cyan, magenta, and yellow patches;
performing a predetermined calculation based on the result of the measurement of said color bar;
comparing the calculation results with a prestored value; and
discriminating a presence/absence of a valid color patch in accordance with the following inequalities for each of said black, cyan, magenta, and yellow patches;
(a.) Black Patch:
Br < BL, Bg < BL, Bb < BL, Br/Bg > BsL1, and Bg/Br > BsL2;
where
Br, Bg, and Bb: measurement values of the black patch in said red, green, and blue channels, respectively;
BsL1: threshold data of a ratio of Br to Bg;
BsL2: threshold data of a ratio of Bg to Br;
BL: minimum threshold data of the black patch;
(b) Cyan Patch:
(Cr/Cb) < CsL;
where
Cr, Cb: measurement value of the cyan patch in red and blue channels, respectively;
CsL: threshold data of a ratio of Cr to Cb;
(c) Magenta Patch:
where
(Mg/Mr) < MsL;
Mg, Mr: measurement values of the magenta patch in green and red channels, respectively;
MsL: threshold data of a ratio of Mg to Mr;
(d) Yellow Patch:
where
(Yb/Yr) < YsL;
Yb, Yr: measurement values of the yellow patch in blue and red channels, respectively;
YsL: threshold data of a ratio of Yb to Yr.

* * * * *